Oct. 7, 1941.  R. G. LE TOURNEAU  2,258,396
TRACTOR AND SEMITRAILER UNIT
Filed June 14, 1940
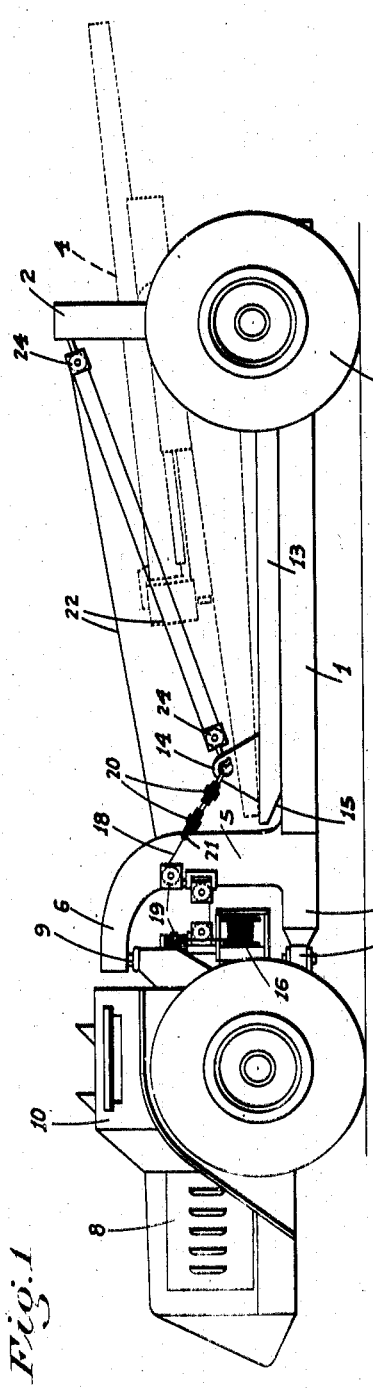
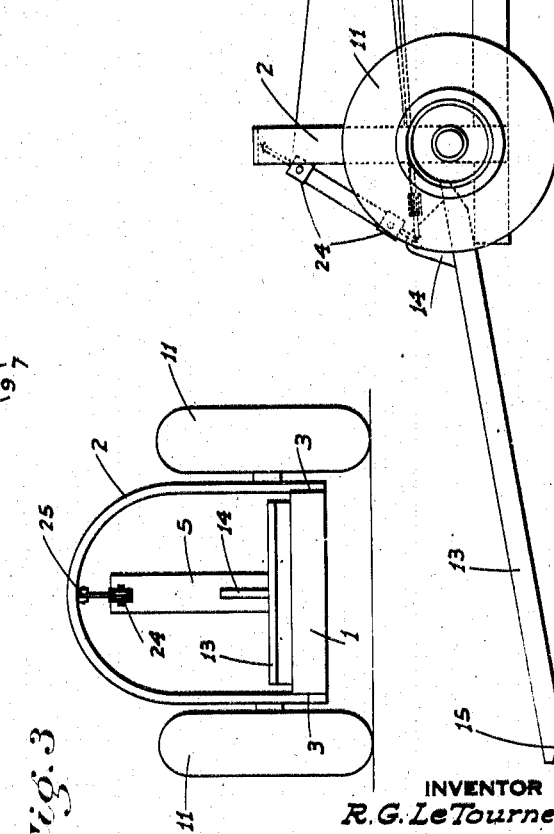
INVENTOR
R. G. LeTourneau
BY
ATTORNEYS Patented Oct. 7, 1941

2,258,396

UNITED STATES PATENT OFFICE 2,258,396

TRACTOR AND SEMITRAILER UNIT

Robert G. Le Tourneau, Peoria, Ill., assignor to R. G. Le Tourneau, Inc., a corporation of California Application June 14, 1940, Serial No. 340,539

8 Claims. (Cl. 214—85)

This invention relates generally to a tractor and semi-trailer unit, and in particular the invention is directed to improvements in the trailer assembly.

The principal object of the present invention is to provide, in the combination of a tractor and semi-trailer, an improved trailer designed to facilitate ready loading or unloading of an implement or other load therefrom.

Another object of the invention is to provide a tractor and semi-trailer unit especially designed to accomplish rapid transportation of armaments such as field guns and the like, and to effect quick loading or unloading thereof from the bed of the semi-trailer.

A further object of the invention is to provide, in a tractor and semi-trailer unit, a movable load-supporting skid adapted to be carried on the bed of the semi-trailer, and associated with power means operative from the tractor to slide such skid on and off said trailer bed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the tractor and implement unit with the skid on the bed.

Figure 2 is a fragmentary elevation of the other side of the unit illustrating the skid entering onto the bed of the trailer.

Figure 3 is a rear end view of the trailer.

Referring now more particularly to the characters of reference on the drawing, the semi-trailer of the unit comprises a flat bed 1 of substantial length and constructed rigidly; such bed being very low-hung, as shown.

At its rear end, the bed 1 is provided with an inverted U-shaped or arch-like member 2 fixed at its lower ends on the sides of the bed as at 3. The arch member 2 is of heavy duty construction, and is of sufficient height and width to permit an implement, such as a field gun 4 to pass therethrough lengthwise.

The forward end of the bed is fixedly secured to the lower end of a centrally disposed, vertical yoke 5 which includes forwardly projecting arms 6 and 7 disposed in vertically spaced and substantially parallel relation.

At their forward ends arms 6 and 7 are mounted in swivel connection with a two wheel tractor 8 of substantially the same type as shown in my already issued United States Patent No. 2,189,072; the connections between said arms and tractor, as indicated generally at 9, being shown in detail in my copending application for U. S. patent Ser. No. 295,460, now Patent No. 2,223,375, in "Connecting means for tractor and implement unit." If the equipment here described is used for military purposes, the tractor will be suitably armored, as shown generally at 10.

The trailer bed, which is horizontal, is supported at its rear end by means of spaced wheels 11 disposed laterally of the arch member 2; the wheel spindles 12 being fixed on the arch member above the plane of the bed so that while the wheels are large, the bed is low-hung as is desired.

An elongated, rectangular skid 13 is adapted to rest on the trailer bed and is of a width to freely pass between the sides or legs of arch member 2. An upstanding eye plate 14 is mounted on the top of the skid at its forward end, for the purpose hereinafter set forth. At the ends, the skid is formed with downwardly facing bevel portions 15 which facilitate movement of the skid on and off the bed 1.

At its rear end, the tractor is provided with a conventional two-drum power control unit; the drums being shown at 16 and 17. The cable 18 from drum 16 passes about a number of suitable and conventionally disposed fair lead sheaves 19 and thence extends to a block and tackle assembly 20, one block of which is secured to yoke 6 some distance above the bed 1, as at 21.

The cable 22 from drum 17 likewise passes through a number of fair lead sheaves 23 and thence extends above the bed 1 to the upper block of another block and tackle assembly 24 swivelly hung from the top and center of arch member 2 as at 25.

Operation

In use, the implement or other load to be transported is disposed on skid 13 while the latter is on the ground; the forward end of such skid being disposed adjacent the rear and open end of the semi-trailer. The lower block of block and tackle assembly 24 is then hooked with eye plate 14 and cable 22 run onto drum 17 lifting said forward end of the skid up and onto the rear end of bed 1 in the manner shown in Fig. 2. Thereupon cable 22 is slacked, and the lower block of block and tackle assembly 20 is hooked to the eye plate 14; cable 18 then being run onto drum 16 drawing the skid and supported implement through arch member 2 onto the bed 1 and to the position shown in Fig. 1.

To unload the skid and implement, the above procedure is merely reversed; the block and tackle assembly 24 which is then drawn out and slopes from the arch member 2 forwardly and downwardly to eye plate 14, is actuated by cable 22 to slide the skid back to a point with its rear end on the ground and to a position where the semi-trailer can be drawn out from under the forward end of said skid. If desired, the block and tackle assembly 24 can be used to effect a gradual lowering of the forward end of the skid as the trailer moves away therefrom.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a tractor and trailer unit, a trailer having a low bed, an arch member fixed on the trailer at its rear end, a load supporting skid normally disposed on the bed and adapted for sliding movement relative to the bed and through the arch member, a multiple drum power control unit on the tractor, a cable leading from said power control unit toward the arch, the free end portion of said cable being formed as a block and tackle, said block and tackle being suspended from the arch member, and another cable leading rearwardly from said power control unit, said block and tackle, and said other cable, being adapted at their free ends for connection with the skid adjacent its forward end.

2. A unit as in claim 1 including an upstanding member mounted on the trailer adjacent its forward end; said other cable being formed at its free end portion as another block and tackle, one block thereof being secured in connection with said upstanding member above the plane of the bed.

3. In a tractor and trailer unit, a trailer having a bed adapted to receive a load, an upstanding member on the forward end of the trailer, said member supporting direction changing sheaves in a plane above the bed, a rigid member mounted in vertically spaced overhanging relation to the rear of the bed and without obstructing rear-end loading of the latter, a sheave attached to said overhanging member, a dual drum power control unit on the tractor, a cable leading from one drum of said unit through one of said direction changing sheaves on said upstanding member and thence through the sheave on the bed overhanging member, and another cable leading from another drum of said power control unit and through another one of said sheaves on said upstanding member, said cables at their free ends being adapted for connection with the load.

4. In a tractor and trailer unit, a tractor having a bed adapted to receive a load, an upstanding member on the forward end of the trailer, said member supporting direction changing sheaves in a plane above the bed, a rigid arch mounted on the rear end of the trailer and spanning the bed, a direction changing sheave suspended from and adjacent the arch at the center, a dual drum power control unit on the tractor, a cable leading from one drum of said unit through one of said sheaves on said upstanding member and thence through the sheave suspended from the arch, and another cable leading from another drum of the power control unit and through another one of said sheaves on said upstanding member, said cables at their free ends being adapted for connection with the load.

5. In a tractor and trailer unit, a tractor having a bed adapted to receive a load, an upstanding member on the forward end of the trailer, said member supporting direction changing sheaves in a plane above the bed, a rigid arch mounted on the rear end of the trailer and spanning the bed, a direction changing sheave suspended from and adjacent the arch at the center, a dual drum power control unit on the tractor and a pair of cables leading from separate drums of said power control unit and passing through separate ones of said sheaves on the upstanding member, the free ends of said cables being arranged with sheaves to form block and tackle units; a sheave of one block and tackle unit being suspended from the arch, and a sheave of the other block and tackle unit being connected to said upstanding member.

6. In a tractor and trailer unit, a trailer including a load supporting bed, a connection yoke adjacent the forward end of the bed, said yoke having vertically spaced forwardly projecting arms, means pivoting said arms at their forward ends on the tractor for relative lateral swinging movement, a power control unit mounted on the tractor between said arms, direction changing sheaves on the yoke above the plane of the bed, and separate cables leading from the power control unit and each passing through a separate one of said sheaves.

7. In a tractor and trailer unit, a trailer including a load supporting bed, a connection yoke adjacent the forward end of the bed, said yoke having vertically spaced forwardly projecting arms, means pivoting said arms at their forward ends on the tractor for relative lateral swinging movement, a power control unit mounted on the tractor between said arms, direction changing sheaves on the yoke above the plane of the bed, a rigid arch spanning the rear end of the bed, a sheave attached to and depending from said arch, separate cables leading from the power control unit and each passing through a separate one of said yoke supported sheaves, and one of said cables thence passing through the arch supported sheave; the cables at their free ends being adapted for connection with the load.

8. In a tractor and trailer unit, a trailer adapted to support a load, a connection yoke on the forward end of the trailer, said yoke having vertically spaced forwardly projecting arms, means pivoting the arms at their forward end on the tractor for relative lateral swinging movement, a power control unit mounted on the tractor between said arms, separate cables leading from the power control unit and extending rearwardly for connection with and to move the load relative to the trailer; there being direction changing pulleys secured on said yoke and through which sheaves the cables pass whereby the cables may extend rearwardly from said sheaves in a predetermined direction regardless of the relative angled position of the tractor and trailer.

ROBERT G. LE TOURNEAU.